Aug. 18, 1931. E. J. MARTEL 1,818,998

CLASP FOR AUTOMOBILE TIRE CHAINS

Filed May 12, 1930

Inventor:
Edgar J. Martel.
by Wright, Brown, Quinby & May,
Attys.

Patented Aug. 18, 1931

1,818,998

UNITED STATES PATENT OFFICE

EDGAR J. MARTEL, OF LACONIA, NEW HAMPSHIRE

CLASP FOR AUTOMOBILE TIRE CHAINS

Application filed May 12, 1930. Serial No. 451,553.

This invention relates to a clasp or fastening device especially for use on an automobile tire chain.

An object of the invention is to provide a clasp of simple but rugged structure which is easy to open and close, but which has means for secure locking against accidental opening when in use. A clasp embodying the invention has been described and illustrated in my copending application Serial No. 348,555, filed March 20, 1929.

For a complete disclosure of the invention reference may be had to the description thereof which follows and to the drawings, of which,—

Figure 1:
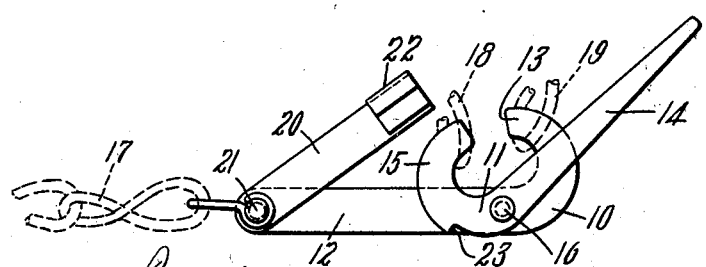
Figure 1 is an elevation of an embodiment of the invention.
Figure 2:
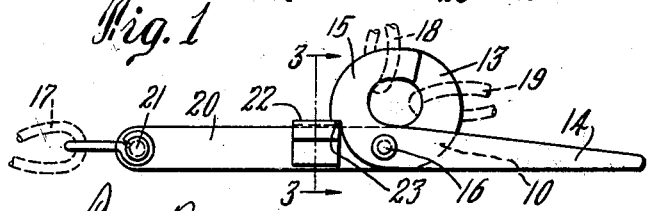
Figure 2 is an elevation of the same showing the clasp in its closed position.
Figure 3:
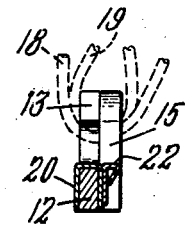
Figure 3 is a section on the line 3—3 of Figure 2.

The clasp shown in Figures 1 and 2 comprises essentially a pair of hooks 10 and 11, the hook 10 having an elongated shank 12 and a semi-circular bend 13 while the hook 11 is provided with a somewhat similar shank 14 and bend 15. The hooks may be pivoted to each other as at 16, the pivot coming preferably at or near the juncture of the shank and bend. As a result of this structure, when the shanks are in a substantially straight line, as shown in Figure 2, the ends of the bends overlap each other to form an enclosed ring. One of the shanks, such as 12, may be permanently secured to an end of one of the side members 17 of a tire chain. The shank 14 may serve as a handle by which the clasp is opened and shut. When the handle 14 is swung upwardly into the position shown in Figure 1, the ends of the bends 13 and 15 separate to receive a link 18 of a cross member of a tire chain and a link 19 at or near the end of the side member 17 of the tire chain which is remote from the end attached to the shank 12. Thus the two ends of the side member 15 of the chain are secured together and to a cross member 18. The clasp is closed by rocking the shank 14 on the pivot 16 until the two shanks are substantially in line. A locking member is provided to prevent accidental opening of a clasp. This locking member includes an arm 20 pivotally mounted as at 21 to the outer end of the shank 12. As shown in Figure 3, the end of the arm 20 remote from the pivot 21 may be in the form of a channel adapted to fit over the shank 12 and thus to prevent positively the possibility of the arm 20 swinging past the shank 12 when moved downwardly from the position shown in Figure 1. This arm may be provided with a laterally projecting lug 22 at its end remote from the pivot 21. The arm is of such a length that the lug 22 is adapted to be engaged by a shoulder 23 formed on the outer periphery of the hook 11. In closing the clasp the handle shank 14 is swung sufficiently far down to enable the arm 20 to swing down to engage the shank 12 without the lug 22 engaging the outer edge of the hook 11. When the arm 20 is seated on the upper edge of the shank 12, the shank 14 is rocked back to position in line with the shank 12, whereupon the shoulder 23 seats on the lug 22 and is stopped thereby. Before the clasp can be opened, it is necessary to swing the shank 14 downwardly to lift the shoulder 23 and to permit the arm 20 and lug 22 to swing upwardly to the position shown in Figure 1. The shank 14 may then be swung upwardly to open the ring formed by the hooks 10 and 11 and to permit the removal of the links 18 and 19 therefrom.

Figure 4:
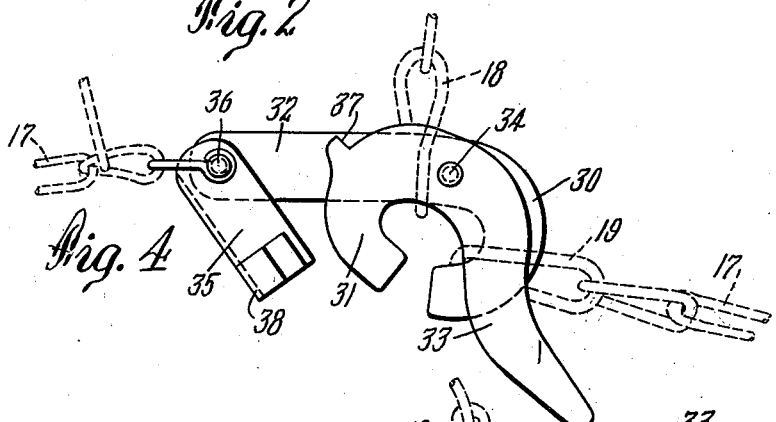
Figure 4 is an elevation of a modified form of the invention.
Figure 5:
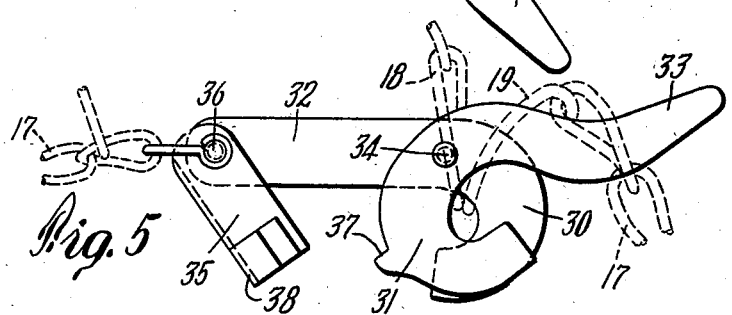
Figures 5 and 6 show different operating positions of the clasp illustrated in Figure 4.
Figure 6:
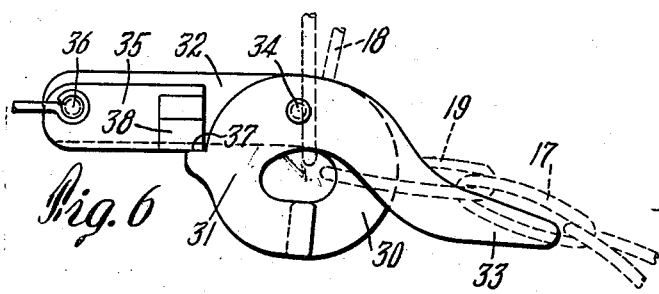

In Figures 4, 5 and 6 is illustrated a slightly modified form of clasp. This clasp is adapted to be mounted on a tire chain in such a way that the ring formed by the hooks opens downwardly instead of upwardly as in Figures 1 and 2. As in the other form of clasp, the hooks comprise bends 30 and 31, and shanks 32 and 33. The shank 33, instead of being substantially straight, is formed with a reverse bend or curve, as shown on the drawing. This is to facilitate the threading of a link 19 of the side member of the automobile tire chain over the shank 33 in the process of catching the link on the bend 30 of the other hook and enables the free end of the shank 33 to rest under and to be protected by the adjacent portion of the side member 17. The hooks are pivotally connected as at 34 so that the shank may be relatively rocked to open and close the clasp by causing the ends of the hooks to separate or overlap. A locking member or arm 35 may be pivotally mounted as at 36 on the end of the shank 32, this locking member acting substantially in the same manner as the locking member 20. A locking shoulder 37 is formed on the outer edge of the bend 31, this shoulder being adapted to engage a lug 38 on the locking member 35, as shown in Figure 6, when the latter seats on the shank 32.

In operating this clasp the shank 33 may be swung downwardly to or slightly beyond the position shown in Figure 4. The links 18 and 19 are then threaded over the shank 33 and the bend 30. The shank 33 is then swung to the position illustrated in Figure 5 to permit the shoulder 37 to clear the lug 38. The arm 35 is then swung into engagement with the edge of the shank 32, whereupon the shank 33 is swung to the position shown in Figure 6, thus completing the closing and locking of the clasp. It is evident from Figure 6 that the side member 17 of the tire chain will cooperate with the locking member 35 in preventing accidental opening of the clasp, since the tension of the side member is such as to pull downwardly on the shank 33 and to press the shoulder 37 against the locking member 35. In this form also the free end of the shank 33 is protected by the side member of the tire chain so that there is considerable less danger of this end catching in ruts, etc. in a road so as to damage or open the clasp.

I claim:

1. A clasp comprising a pair of hooks, each having a shank and a bend, means for pivotally connecting said hooks at the juncture of the shank and bend so that the bends overlap to form a closed ring when the shanks extend in substantially opposite directions, a shoulder formed on the outer edge of the bend of one of said hooks, and a locking member movable into position between said shoulder and an edge of the shank of the other hook.

2. A clasp comprising a pair of hooks, each having a shank and a bend, said hooks being pivotally connected near the points of juncture of their shanks and bends, whereby the ends of the bends overlap to form a closed ring when the shanks extend in substantially opposite directions, a locking member pivotally mounted on the shank of one of said hooks, and a shoulder on the other hook adapted to engage a portion of said locking member when the locking member is in locking position.

3. A clasp comprising a pair of hooks, each having a shank and a semi-circular bend, means pivotally connecting said hooks at the juncture of the shank and bend whereby the bends form a closed ring when the shanks are substantially aligned, a locking arm pivotally attached to one of said shanks and movable to seat on an edge of the same shank, a laterally extending lug on the end of said arm remote from its pivot, and a shoulder on the opposite hook movable into engagement with said lug when the arm is in locking position to prevent the opening of said ring.

4. A clasp comprising a pair of hooks, each having a shank and a semi-circular bend, one of said shanks having a reverse curve therein, means pivotally connecting said hooks at the juncture of the shank and bend whereby the bends overlap to form a closed ring when the shanks are substantially aligned, and means for locking the hooks against ring opening movements.

5. A clasp comprising a pair of hooks each having a shank and a bend, means for pivotally connecting said hooks to swing from a closed position in which the shanks are substantially aligned and the bends form a closed ring, to an open position in which said shanks are out of alignment and said ring is open, said hooks being adapted to swing past their normal closed position in their closing motion, and a locking piece carried by one of said hooks and movable to engage between portions of both hooks when they have been swung past their normal closed position whereby reverse swing toward the open position is stopped when the hooks are in their normal closed position.

In testimony whereof I have affixed my signature.

EDGAR J. MARTEL.